(12) United States Patent
Sacheti

(10) Patent No.: US 7,945,031 B2
(45) Date of Patent: May 17, 2011

(54) INTERNET-BASED METHOD FOR ALERTING AN INDIVIDUAL WITH AN UNLISTED TELEPHONE NUMBER THAT AN ACQUAINTANCE WISHES TO CONTACT THAT INDIVIDUAL

(76) Inventor: Kushal Sacheti, New York, NY (US)

( * ) Notice: Subject to any disclaimer, the term of this patent is extended or adjusted under 35 U.S.C. 154(b) by 901 days.

(21) Appl. No.: 11/904,346

(22) Filed: Sep. 27, 2007

(65) Prior Publication Data

US 2008/0298565 A1 Dec. 4, 2008

Related U.S. Application Data

(60) Provisional application No. 60/932,541, filed on May 30, 2007.

(51) Int. Cl.
*H04M 11/00* (2006.01)
(52) U.S. Cl. ................. 379/93.01; 379/211.01
(58) Field of Classification Search ............... 379/93.01, 379/114.05, 211.01
See application file for complete search history.

(56) References Cited

U.S. PATENT DOCUMENTS

| | | | | |
|---|---|---|---|---|
| 5,450,476 A | * | 9/1995 | D'Apuzzo et al. | 379/88.23 |
| 5,613,006 A | * | 3/1997 | Reese | 379/67.1 |
| 5,809,114 A | * | 9/1998 | Solomon et al. | 379/88.19 |
| 5,818,836 A | * | 10/1998 | DuVal | 370/389 |
| 5,991,369 A | * | 11/1999 | Petrunka et al. | 379/88.25 |
| 6,798,772 B2 | * | 9/2004 | Bergman et al. | 370/354 |
| 6,917,674 B2 | * | 7/2005 | Gilbert | 379/201.11 |
| 2003/0206616 A1 | * | 11/2003 | Dowdy | 379/67.1 |

* cited by examiner

*Primary Examiner* — Creighton Smith
(74) *Attorney, Agent, or Firm* — Charles E. Baxley

(57) ABSTRACT

An Internet-based method for alerting an individual with an unlisted telephone number that an acquaintance wishes to contact that individual, including the steps of: establishing, by a webmaster, a website having an administrator; registering, by the individual with the unlisted telephone number, the unlisted telephone number of the individual on the website for a recurring fee after the individual has been guaranteed confidentiality; logging onto the website, by the acquaintance; determining, by the acquaintance, if the individual the acquaintance is trying to contact is in fact registered on the website; terminating, if answer to the determining step is no; paying a fee, by the acquaintance, if answer to the determining step is yes; entering information on the website, by the acquaintance, pertaining to the acquaintance for helping the individual with the unlisted telephone number recognize the acquaintance, and contact information of the acquaintance including the telephone number of the acquaintance; forwarding, by the administrator of the website, the information of the acquaintance to the individual with the unlisted number; simultaneously, informing the acquaintance, by the administrator of the website, that the information of the acquaintance has been forwarded to the individual with the unlisted number; and determining using the information of the acquaintance, by the individual with the unlisted telephone number, if the individual with the unlisted telephone number wants to contact the acquaintance.

1 Claim, 4 Drawing Sheets

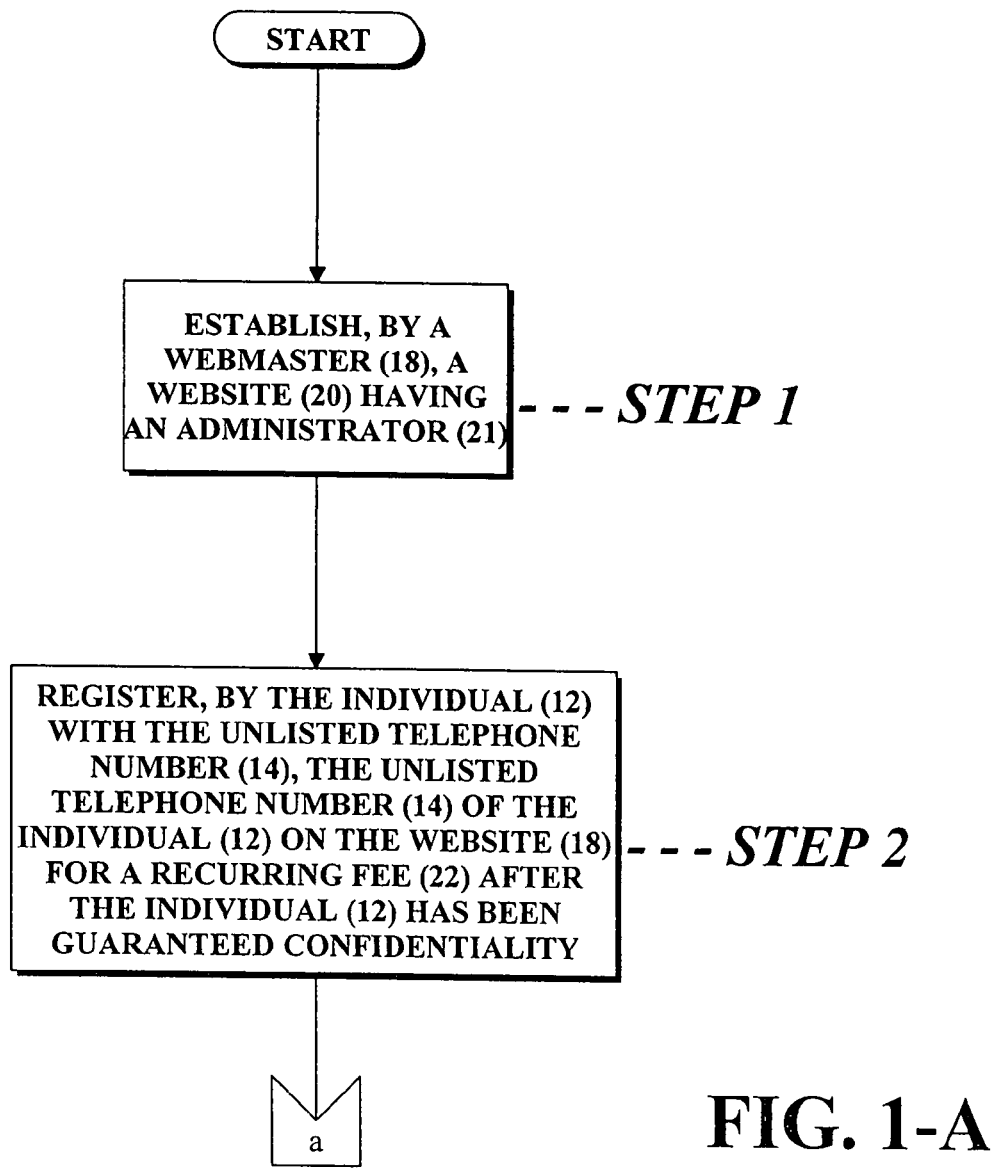
FIG. 1-A

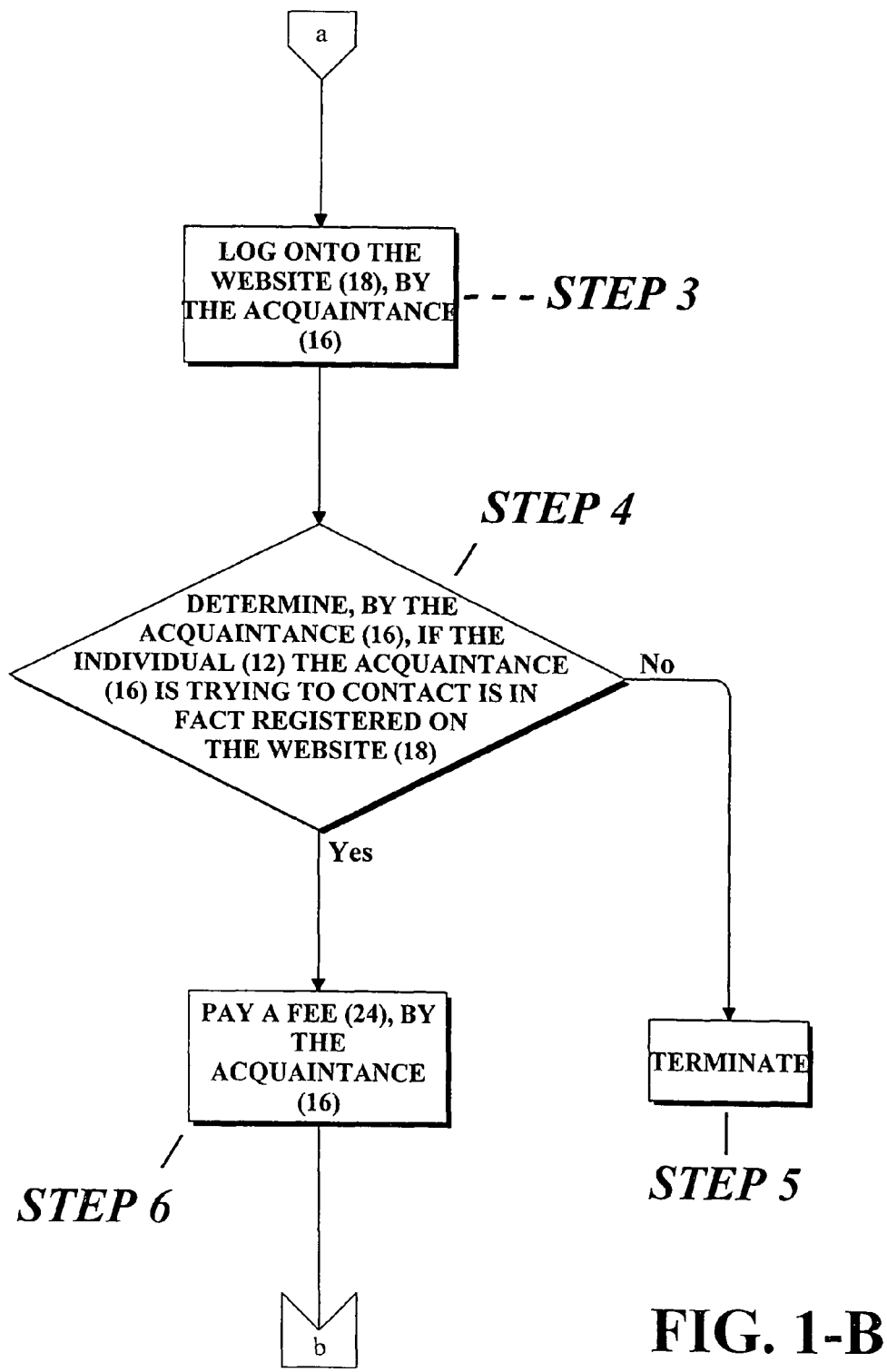
FIG. 1-B

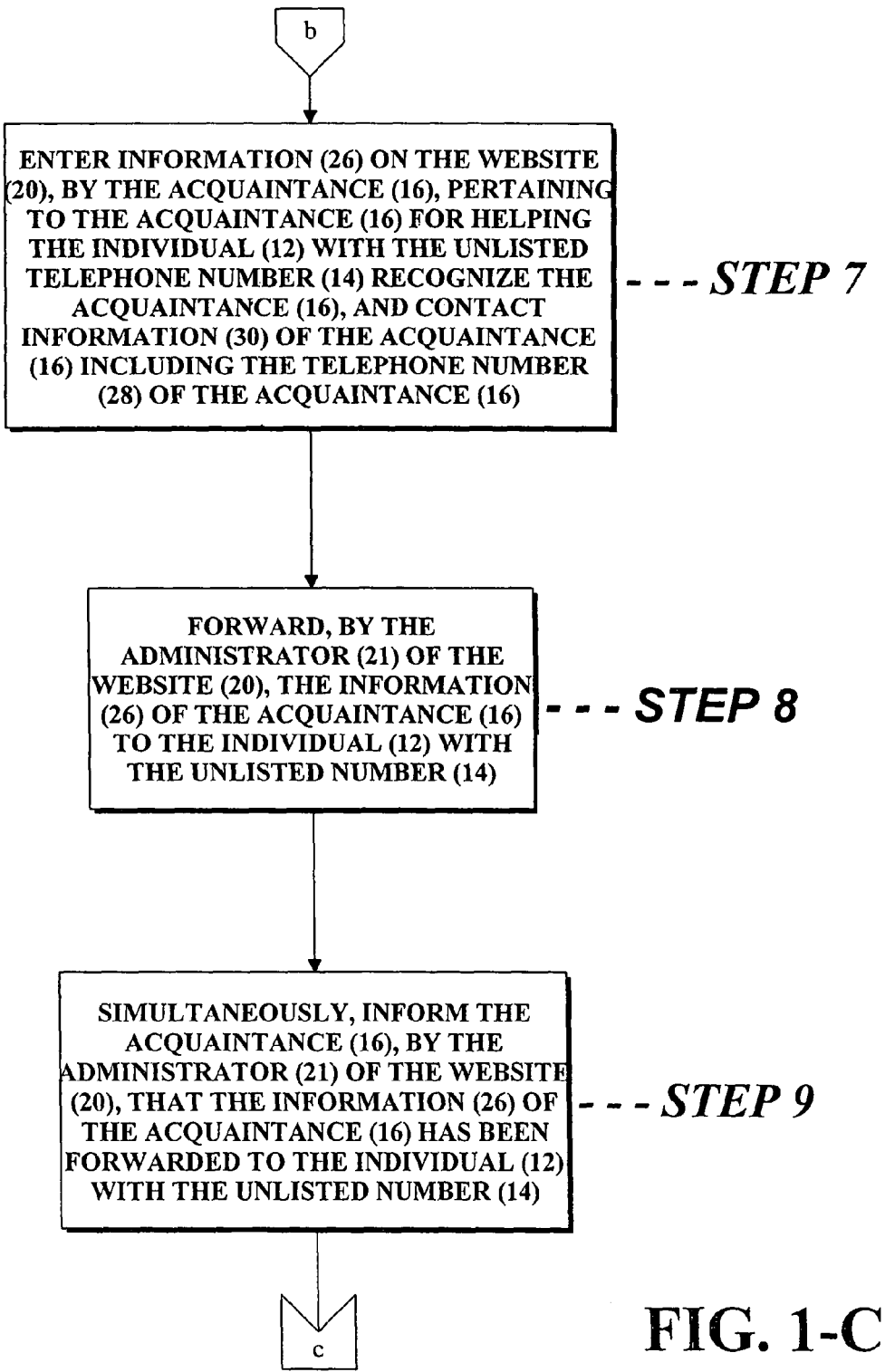
FIG. 1-C

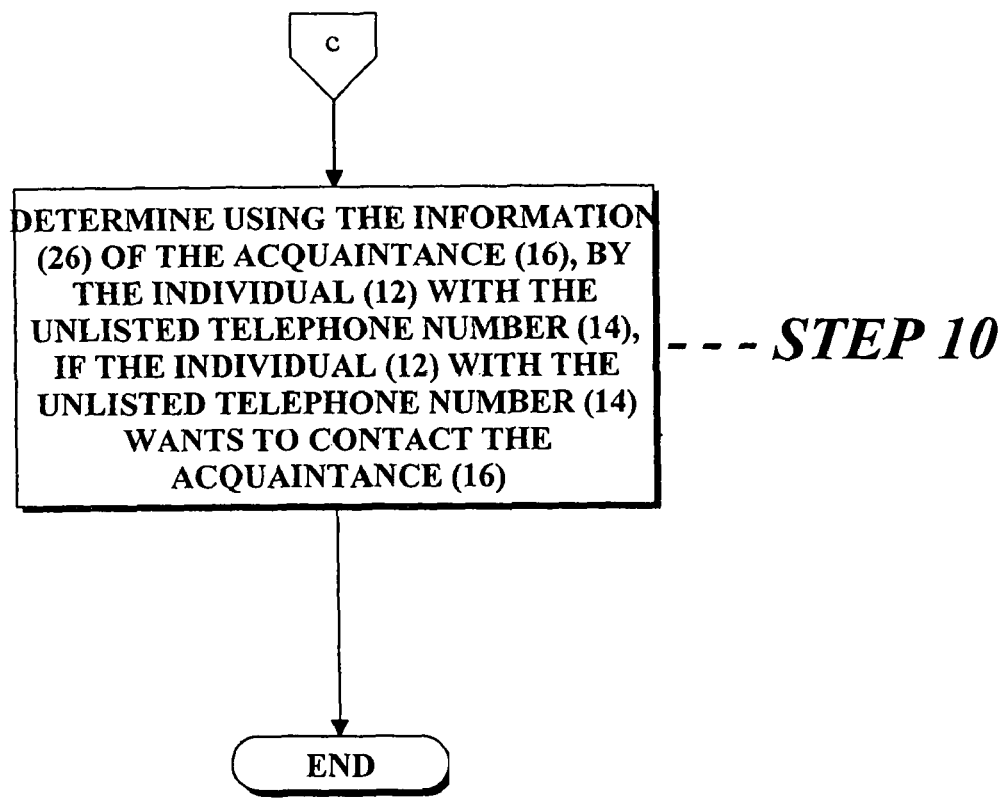
FIG. 1-D

INTERNET-BASED METHOD FOR ALERTING AN INDIVIDUAL WITH AN UNLISTED TELEPHONE NUMBER THAT AN ACQUAINTANCE WISHES TO CONTACT THAT INDIVIDUAL

CROSS REFERENCE TO RELATED APPLICATIONS

The instant non provisional patent application claims priority from provisional patent application No. 60/932,541, filed May 30, 2007, entitled ANSWERING SERVICE FOR UNLISTED TELEPHONE NUMBERS, and incorporated herein by reference thereto.

BACKGROUND OF THE INVENTION

A. Field of the Invention

The embodiments of the present invention relate to an internet-based method, and more particularly, the embodiments of the present invention relate to an Internet-based method for alerting an individual with an unlisted telephone number that an acquaintance wishes to contact that individual.

B. Description of the Prior Art

There are large numbers of individuals in the United States who have unlisted telephone numbers. The reasons why they choose to keep their telephone numbers unlisted are varied. Using an unlisted telephone number, however, can have some undesirable results. For example, an acquaintance who has not been in frequent contact with the individual may wishes to get in touch with the individual. This acquaintance armed with only the individual's name and some general data may be able to locate the whereabouts of the individual using various search engines, but in the absence of a telephone number of the individual, will be unable to contact the individual quickly. This could mean a missed opportunity for the individual with the unlisted telephone number.

Numerous innovations for telephony methods and/or apparatuses have been provided in the prior art that will be described below, which are in chronological order to show advancement in the art, and which are incorporated herein by reference thereto. Even though these innovations may be suitable for the specific individual purposes to which they address, they each differ in structure, and/or operation, and/or purpose, from the embodiments of the present invention, in that they do not teach an Internet-based method for alerting an individual with an unlisted telephone number that an acquaintance wishes to contact that individual.

(1) U.S. Pat. No. 5,058,152 to Solomon et al.

U.S. Pat. No. 5,058,152 issued to Solomon et al. on Oct. 15, 1991 in class 379 and subclass 67 teaches a method and apparatus for establishing telephone communications between anonymous service subscribers and responding callers over public telephone lines employing the Direct Inward Dialing ("DID") feature to enable complete confidentiality and mutual anonymity between a caller and a subscriber and to effect immediate connecting to a subscriber without touch tone or verbal input. The system also is used as an unpublished telephone number service to enable a caller to place a message that is relayed to a subscriber. The subscriber, based on the caller's message, then can return the call to communicate with the caller. Further, the system may be used to enable a subscribing caller to place calls to persons having caller identification telephone equipment capable of identifying the telephone numbers of callers.

(2) U.S. Pat. No. 5,450,476 to D'Apuzzo et al.

U.S. Pat. No. 5,450,476 issued to D'Apuzzo et al. on Sep. 12, 1995 in class 379 and subclass 88 teaches a Nonpublished Number Messaging ("NPNM") system allowing a caller to leave a message for a party having a nonpublished telephone number. When a caller calls directory assistance to request a telephone number, an operator service system ("OSS") switch routes the call to a directory assistance operator. The operator enters the requested listing into an operator console and a search is made in an OSS database ("DB"). When it is determined that the requested telephone number is nonpublished, the OSS switch routes the call to an audio response unit ("ARU"), which plays a recorded message, and then routes the call to a voice mail service ("VMS") provider. The VMS provider records a message left by the caller and then delivers it to the appropriate party.

(3) U.S. Pat. No. 5,613,006 to Reese.

U.S. Pat. No. 5,613,006 issued to Reese on Mar. 18, 1997 in class 379 and subclass 67 teaches an automated directory assistance call completion and calling number delivery system allowing a party to call a telephone or a cellular company directory assistance operator, request a phone number of a person to be contacted and asks that the call be completed automatically. The system is responsive to a predetermined code keyed-in on a keypad of the calling party pushbutton phone, or to a voice response from the calling party, for automatically completing the call to an idle or an in-use telephone station of the person to be contacted, and for disclosing the calling party directory telephone number with a corresponding name to the person to be contacted. The person to be contacted is then in a position to decide whether or not to answer the call based on the identity of the calling party. Whether the call is answered or not the person to be contacted, the apparatus receives, displays, and stores the calling party directory telephone number with the corresponding name for later recall, visual display, and automatic or manual dialing of the stored directory telephone number with the corresponding name.

(4) U.S. Pat. No. 5,809,114 to Solomon et al.

U.S. Pat. No. 5,809,114 issued to Solomon et al. on Sep. 15, 1998 in class 379 and subclass 89 teaches an anonymous interactive telephone system for connecting a caller to a subscriber without divulging the identity or telephone number of either unless voluntarily revealed. The subscriber publishes an advertisement together with a telephone number of a system controller station. A subscriber reference number is embedded within the telephone number of the system controller station as a DID number. The subscriber also supplies information to the system controller station related to time periods during which calls may be directly forwarded to the subscriber or intercepted by the system controller. The system controller repeatedly accesses the central switching station or local switching station of the public telephone company to activate and de-activate the call forwarding function of the switching station for controlling call forwarding to the subscriber on the basis of the subscriber's published DID number. A call screening system having answer machine style interfacing is further provided.

(5) U.S. Pat. No. 5,818,836 to DuVal.

U.S. Pat. No. 5,818,836 issued to DuVal on Oct. 6, 1998 in class 370 and subclass 389 teaches an anonymous telephone communication system. The system includes an anonymous voice system establishing an anonymous telephone communication through a circuit switched network ("CSN"). In operation, two parties place separate telephone calls to the anonymous voice system through the CSN. The parties then enter matchcodes through their telephone keypads. The anonymous voice system compares the matchcodes entered by the parties and connects the telephone calls if the matchcodes match. The system may include an on-line data service establishing electronic communication between the parties through corresponding data terminals. The data terminals may have resident anonymous voice input commands that can be selected by the parties. The on-line data service transmits a connect command to the anonymous voice system, which dials the two parties, or waits for the parties to dial the system, and then connects the parties. The anonymous voice system sends a disconnect command to the on-line data service when the parties hang up. The disconnect command can be used by the online service to bill the parties for using the anonymous voice service. The system also stores a couple record during the first anonymous call recording the matchcode and the telephone numbers of both parties. Subsequently, either party may initiate an anonymous call to the other party without prior coordination.

(6) U.S. Pat. No. 5,991,369 to Petrunka et al.

U.S. Pat. No. 5,991,369 issued to Petrunka et al. on Nov. 23, 1999 in class 379 and subclass 88.25 teaches a system and method for directing directory assistance calls allowing a caller seeking a non-published number to access a voice mail box associated with the non-published number. If a caller calls directory assistance to request a telephone number determined to be non-published, the call may be routed to an automatic recording indicating that the caller may leave a message. The caller may then leave a voice mail message for delivery to the appropriate party.

(7) U.S. Pat. No. 6,542,596 to Hill et al.

U.S. Pat. No. 6,542,596 issued to Hill et al. on Apr. 1, 2003 in class 379 and subclass 207.02 teaches an intelligent network telephone system for terminating calls to subscribers to a privacy screening service when the calling party has a private telephone number. Privacy screening services allow a subscriber to manage and monitor incoming telephone calls, such that unwanted calls are not terminated to the subscriber. When a calling party dials the telephone number of a subscriber to a privacy screening service, the system manages the call according to whether the calling party number is known and public, known and private, or unknown. If the calling party number is known and public, the call is routed to the subscriber. If the calling party is known and private, the call is routed to a service node playing an announcement to the calling party asking the calling party for permission to override his or her privacy. If the calling party agrees, the service node dials a customized dialing plan ("CDP") code that triggers an info-analyzed query from the service node's service switching point ("SSP") to a service control point ("SCP"). If the calling party is unknown, the service node asks the calling party to record his or her name. If the calling party records his or her name, the service node dials a CDP code, which triggers an info-analyzed query to the SCP.

(8) United States Patent Application Publication Number 2003/0206616 to Dowdy.

United States Patent Application Publication Number 2003/0206616 published to Dowdy on Nov. 6, 2003 in class 379 and subclass 67.1 teaches an unlisted number call messaging service for allowing a calling party to be able to leave a message for an unlisted party. In particular, the calling party leaves a message for the unlisted party. The message is associated with the unlisted party and the unlisted party is notified of the message via a predetermined procedure. The unlisted party, upon receipt of the message notification, then has the option to, for example, review the message.

(9) U.S. Pat. No. 6,798,772 to Bergman et al.

U.S. Pat. No. 6,798,772 issued to Bergman et al. on Sep. 28, 2004 in class 370 and subclass 354 teaches a caller placing a telephone call and entering an access code when calling a subscriber. The caller's access code signal is generated by the caller when the caller inputs his or her access code. The call is transmitted over the Public Switched Telephone Network to a subscriber's telephone number. A Call Router Server capable of receiving the caller's telephone call and the caller's access code signal is provided. The Call Router Server detects the caller's access code signal and then directs the caller's telephone call to the subscriber to be completed in a particular manner based upon the caller's access code. An Access Code Server being a Web server allows a subscriber to input the manner in which incoming telephone calls will be received and completed based upon the access code signal that is received by the Call Router Server. This information is stored on a Database Server, which instructs the Call Router Server on the proper routing pattern of the incoming telephone call.

(10) U.S. Pat. No. 6,917,674 B2 to Gilbert.

U.S. Pat. No. 6,917,674 B2 issued to Gilbert on Jul. 12, 2005 teaches a method and system for notifying a non-published customer of a telephone network the number and possibly the identity of callers who have been attempting to obtain their non-published number from directory assistance. When a calling party calls for directory assistance, it is determined whether the telephone number sought is a non-published. If so, the call is forwarded to a service package application on a service node where at least a telephone number, and preferably also the name, of the calling party is obtained. A notification call is then placed to the non-published customer and the customer is provided with at least the telephone number and possibly the name of the calling party.

It is apparent that numerous innovations for telephony methods and apparatuses have been provided in the prior art that are adapted to be used. Furthermore, even though these innovations may be suitable for the specific individual purposes to which they address, they would not be suitable for the purposes of the embodiments of the present invention as heretofore described, namely, an Internet-based method for alerting an individual with an unlisted telephone number that another individual wishes to contact that individual.

SUMMARY OF THE INVENTION

Thus, an object of the embodiments of the present invention is to provide an Internet-based method for alerting an individual with an unlisted telephone number that an acquaintance wishes to contact that individual, which avoids the disadvantages of the prior art.

Briefly stated, another object of the embodiments of the present invention is to provide an Internet-based method for alerting an individual with an unlisted telephone number that an acquaintance wishes to contact that individual, including the steps of: establishing, by a webmaster, a website having an administrator; registering, by the individual with the unlisted telephone number, the unlisted telephone number of the individual on the website for a recurring fee after the individual has been guaranteed confidentiality; logging onto the website, by the acquaintance; determining, by the acquaintance, if the individual the acquaintance is trying to contact is in fact registered on the website; terminating, if answer to the determining step is no; paying a fee, by the acquaintance, if answer to the determining step is yes; entering information on the website, by the acquaintance, pertaining to the acquaintance for helping the individual with the unlisted telephone number recognize the acquaintance, and contact information of the acquaintance including the telephone number of the acquaintance; forwarding, by the administrator of the website, the information of the acquaintance to the individual with the unlisted number; simultaneously, informing the acquaintance, by the administrator of the website, that the information of the acquaintance has been forwarded to the individual with the unlisted number; and determining using the information of the acquaintance, by the individual with the unlisted telephone number, if the individual with the unlisted telephone number wants to contact the acquaintance.

The novel features which are considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying drawing.

BRIEF DESCRIPTION OF THE DRAWING

The figures of the drawing are briefly described as follows:

FIG. 1A-1D are a flowchart of the Internet-based method of the embodiments of the present invention for alerting an individual with an unlisted telephone number that an acquaintance wishes to contact that individual.

LIST OF REFERENCE NUMERALS UTILIZED IN THE DRAWING

10 Internet-based method of embodiments of present invention for alerting individual 12 with unlisted telephone number 14 that acquaintance 16 wishes to contact that individual 12
12 individual with unlisted telephone number 14
14 unlisted telephone number
16 acquaintance
18 webmaster
20 website
21 administrator of website 20
22 recurring fee of individual 12 with unlisted telephone number 14
24 fee of acquaintance 16
26 information of acquaintance 16
28 telephone number of acquaintance 16

DETAILED DESCRIPTION OF THE PREFERRED EMBODIMENTS

A. General

Referring now to the figures, in which like numerals indicate like parts, and particularly to FIGS. 1A-1D, which are a flowchart of the Internet-based method of the embodiments of the present invention for alerting an individual with an unlisted telephone number that an acquaintance wishes to contact that individual, the Internet-based method of the embodiments of the present invention is shown generally at 10 for alerting an individual 12 with an unlisted telephone number 14 that an acquaintance 16 wishes to contact that individual 12.

B. The Method

The Internet-based method 10 for alerting an individual 12 with an unlisted telephone number 14 that an acquaintance 16 wishes to contact that individual 12, comprises the steps of:
STEP 1: Establish, by a webmaster 18, a website 20 having an administrator 21.
STEP 2: Register, by the individual 12 with the unlisted telephone number 14, the unlisted telephone number 14 of the individual 12 on the website 18 for a recurring fee 22 after the individual 12 has been guaranteed confidentiality.
STEP 3: Log onto the website 18, by the acquaintance 16.
STEP 4: Determine, by the acquaintance 16, if the individual 12 the acquaintance 16 is trying to contact is in fact registered on the website 18.
STEP 5: If no, terminate.
STEP 6: If yes, pay a fee 24, by the acquaintance 16.
STEP 7: Enter information 26 on the website 20, by the acquaintance 16, pertaining to the acquaintance 16 for helping the individual 12 with the unlisted telephone number 14 recognize the acquaintance 16, and contact information 30 of the acquaintance 16 including the telephone number 28 of the acquaintance 16.
STEP 8: Forward, by the administrator 21 of the website 20, the information 26 of the acquaintance 16 to the individual 12 with the unlisted number 14.
STEP 9: Simultaneously, inform the acquaintance 16, by the administrator 21 of the website 20, that the information 26 of the acquaintance 16 has been forwarded to the individual 12 with the unlisted number 14.
STEP 10: Determine using the information 26 of the acquaintance 16, by the individual 12 with the unlisted telephone number 14, if the individual 12 with the unlisted telephone number 14 wants to contact the acquaintance 16.

C. The Conclusions

It will be understood that each of the elements described above or two or more together may also find a useful application in other types of constructions differing from the types described above.

While the embodiments of the present invention have been illustrated and described as embodied in an Internet-based method for alerting an individual with an unlisted telephone number that an acquaintance wishes to contact that individual, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt it for various applications without omitting features that from the standpoint of prior art fairly constitute characteristics of the generic or specific aspects of the embodiments of the present invention.

The invention claimed is:

1. An Internet-based method for alerting an individual with an unlisted telephone number that an acquaintance wishes to contact that individual, comprising the steps of:
   a) establishing, by a webmaster, a website having an administrator;
   b) registering, by the individual with the unlisted telephone number, the unlisted telephone number of the individual on the website for a recurring fee after the individual has been guaranteed confidentiality;
   c) logging onto the website, by the acquaintance;
   d) determining, by the acquaintance, if the individual the acquaintance is trying to contact is in fact registered on the website;
   e) terminating, if answer to said determining step is no;

f) paying a fee, by the acquaintance, if answer to said determining step is yes;

g) entering information on the website, by the acquaintance, pertaining to the acquaintance for helping the individual with the unlisted telephone number recognize the acquaintance, and contact information of the acquaintance including the telephone number of the acquaintance;

h) forwarding, by the administrator of the website, the information of the acquaintance to the individual with the unlisted number;

i) simultaneously, informing the acquaintance, by the administrator of the website, that the information of the acquaintance has been forwarded to the individual with the unlisted number; and j) determining using the information of the acquaintance, by the individual with the unlisted telephone number, if the individual with the unlisted telephone number wants to contact the acquaintance.

* * * * *